(12) United States Patent
Farrell et al.

(10) Patent No.: US 8,164,783 B2
(45) Date of Patent: Apr. 24, 2012

(54) AUTOMATIC IMPOSITION GUTTER REMOVAL

(75) Inventors: Michael E. Farrell, Webster, NY (US); Javier A. Morales, Irondequoit, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/012,999

(22) Filed: Jan. 25, 2011

(65) Prior Publication Data
US 2011/0116134 A1 May 19, 2011

Related U.S. Application Data

(63) Continuation-in-part of application No. 11/599,875, filed on Nov. 15, 2006, now abandoned.

(51) Int. Cl.
*G06K 15/00* (2006.01)
(52) U.S. Cl. ............... 358/1.18; 358/1.2; 358/1.9
(58) Field of Classification Search ............... 358/1.18; 399/40–62; 715/200–277
See application file for complete search history.

(56) References Cited

U.S. PATENT DOCUMENTS

| | | | | |
|---|---|---|---|---|
| 4,675,743 A * | 6/1987 | Riseman et al. | ............. | 358/3.23 |
| 5,461,469 A * | 10/1995 | Farrell et al. | ............... | 399/407 |
| 6,046,818 A | 4/2000 | Benson | | |
| 6,438,273 B1 | 8/2002 | Loce et al. | | |
| 2003/0020956 A1 * | 1/2003 | Goel et al. | ................... | 358/1.18 |
| 2006/0082793 A1 | 4/2006 | Goel et al. | | |

* cited by examiner

*Primary Examiner* — Benny Q Tieu
*Assistant Examiner* — Marcellus Augustin
(74) *Attorney, Agent, or Firm* — Fay Sharpe LLP

(57) ABSTRACT

A method and apparatus for printing a plurality of documents juxtaposed for imposition on a print media sheet without gutters. The document images are rasterized and a band of single or multiple pixels is selected along the image margins and compared to determine if adjacent bands are within a predetermined tolerance value. If so, the images are juxtaposed without a gutter; and, if not, one image is rotated 180° and the comparison repeated. If the comparison still is not within a predetermined tolerance value, the juxtaposed images are imposed with a gutter.

17 Claims, 3 Drawing Sheets

NO GUTTER

GUTTER

AUTOMATIC IMPOSITION GUTTER REMOVAL

This application is a Continuation-in-Part of U.S. Utility application Ser. No. 11/599,875, filed Nov. 15, 2006 and is incorporated herein by reference in its entirety.

BACKGROUND

The present disclosure relates to the imposition of a plurality of pages or images (N-up) on a sheet for printing where the individual pages are to be cut from the sheet and trimmed in post press operations.

Heretofore, imposition templates have provided for a gutter or gap between pages to provide space between the image bleed areas provided for accommodating trimming of the image to final page size. Gutters thus require two trimming or cutting operations to remove and result in the use of added sheet material and toner or ink in the bleed area. If it was desired to eliminate a gutter, manual creation of a specific template was required.

The elimination of gutters not only saves the waste of scrap sheet material or substrate and ink or toner but would reduce the time required to complete the job by eliminating some of the cutting operations for separating adjacent pages.

Where automatic image placement for imposition is intended, it has been desired to provide a way or means to minimize and/or eliminate gutters without job specific templates or manual operations.

BRIEF DESCRIPTION

The present disclosure describes method and apparatus for imposing adjacent pages on a sheet for printing in a manner which minimizes the need for gutters between adjacent pages. The images of the adjacent pages to be imposed are evaluated for similarity or common content in the bleed or trim zone. Where the content is sufficiently common the adjacent images may be abutted, thereby eliminating a gutter and subsequently reducing a number of trimming operations required.

The images of the pages to be placed adjacent or juxtaposed are rasterized; and, a band of pixels along the margins of these images is selected and the bands compared to determine if they are within a predetermined tolerance value of commonality. If such is the case, the pages may be abutted without a gutter; and, if they are not within a predetermined tolerance value of commonality, one of the pages is rotated 180° and the adjacent pixel bands are again compared. If the second comparison does not provide commonality within the predetermined tolerance value, the images are then juxtaposed with a gutter. The selected band of pixels may be either a band of single pixels or a band of multiple pixel width.

DETAILED DESCRIPTION

Figure 1:
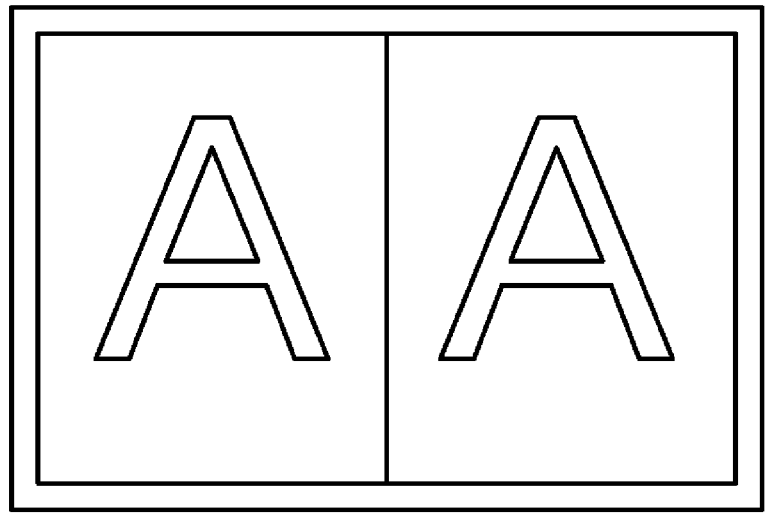
FIG. 1 is a plan view of two-up pages placed for imposition on a sheet without a gutter between adjacent margins.
Figure 2:
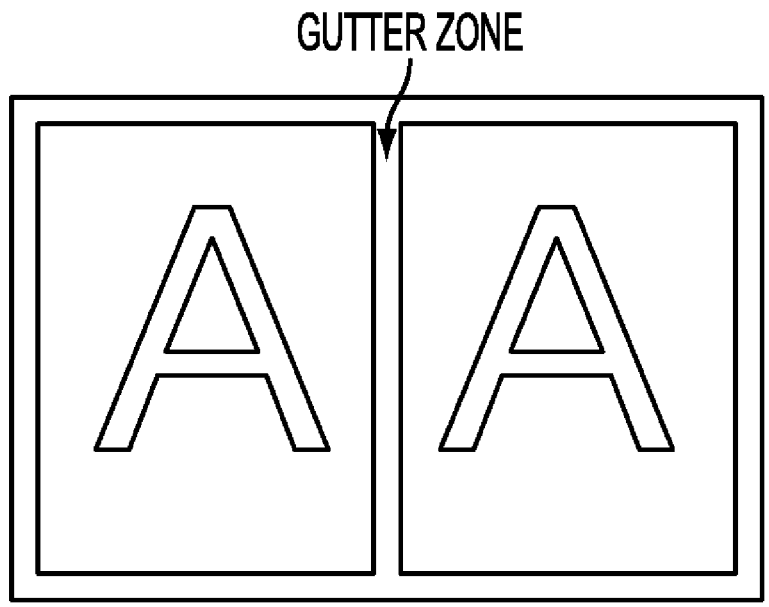
FIG. 2 is view similar to FIG. 1 illustrating adjacent images placed with a gutter therebetween.

Typical examples of two-up images or pages placed for imposition on a print media sheet with and without gutters are shown in FIGS. 1 and 2.

Figure 3:
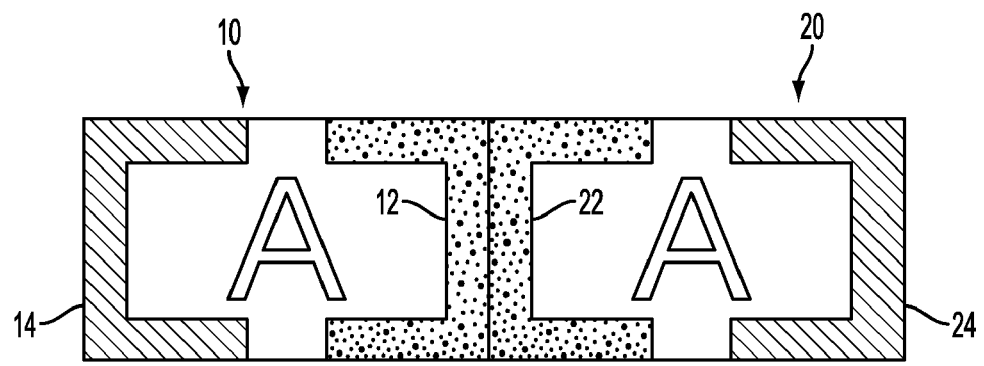
FIG. 3 is a plan view of adjacent pages oriented upright with images having the adjacent margins with common pixel content.

Referring to FIG. 3, a sheet of print media or substrate (not shown) is intended to have imposed thereon two pages containing respectively images indicated generally at 10, 20 which in the illustrated exemplary embodiment are presented in the configuration of business cards; however, it will be understood that common page sizes for books, pamphlets, periodicals or other documents may also be employed.

Each of the images 10, 20 has corresponding margins indicated respectively 12, 22 and 14, 24 with a selected band of pixels which may comprise either a band of single pixels or a band of multiple pixels of a desired width. In a exemplary embodiment illustrated in FIG. 3, the adjacent marginal bands 12, 22 which are inside the printable content have been determined to have, within a predetermined tolerance band, sufficient commonality of pixel content, as, for example, a consistent pattern, i.e., repeating pattern, solid tint or color, such that the pages 10, 20 may be abutted in a gutterless manner with the same or a common orientation as indicated by the letter "A" on the adjacent images being disposed in an upright orientation. The adjacent marginal bands may be multiple colors so long as the bands on two adjacent page images form a constant pattern.

Figure 4:
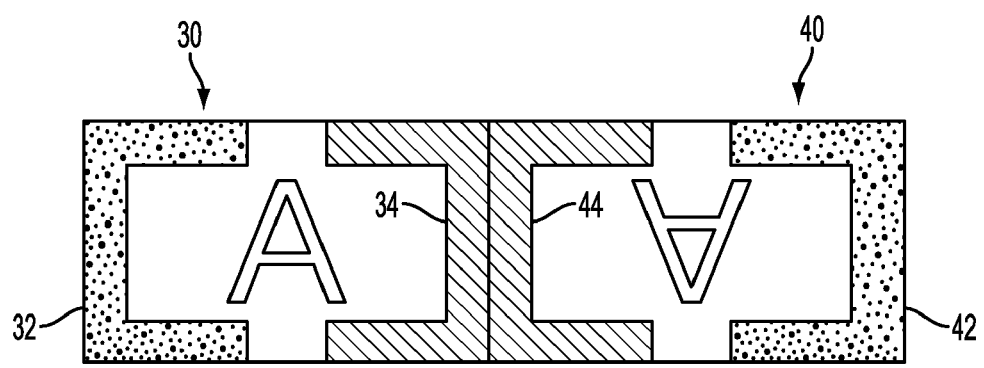
FIG. 4 is view similar to FIG. 3 with adjacent images oriented with one inverted and having the opposite margins with common pixel content and abutted without a gutter.

Referring to FIG. 4, another exemplary embodiment is illustrated in which a pair of pages having identical images indicated generally at 30, 40 are disposed such that one image is rotated 180° with respect to the other. In the embodiment of FIG. 4, the system has determined that the corresponding marginal pixel bands 32, 42 for upright orientation are not sufficiently common within a predetermined tolerance band to permit their abutment. Thus, in the embodiment of FIG. 4, one of the pages has been rotated 180° with respect to the other such that the corresponding opposite marginal pixel bands 34, 44, which have been determined to have a common pixel content within a predetermined tolerance band, have been abutted without a gutter. The arrangement of FIG. 4 thus enables gutterless imposition of the adjacent images, which, if imposed both upright, would require a gutter.

Figure 5:
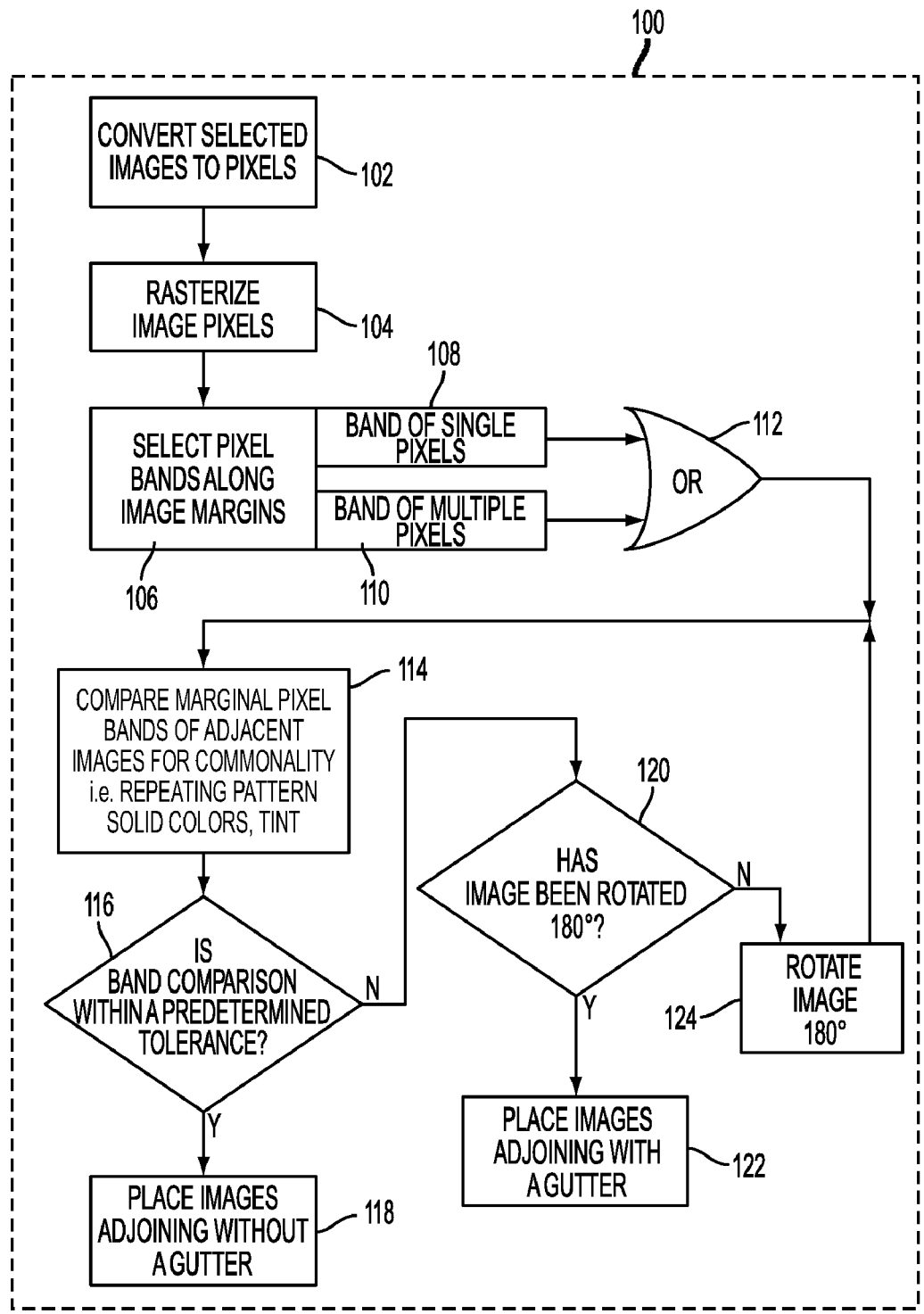
FIG. 5 is a flow diagram of the system operation for implementing the determination of commonality of pixel content.

Referring to FIG. 5, the electronic system of the present disclosure is indicated generally at 100 and is operative at step 102 to convert the selected images or pages, to be juxtaposed, to pixels. The system then proceeds to step 104 and rasterizes the image pixels of step 102. In the present practice, it has been found satisfactory to rasterize the pixels from about 150 lines per inch to about 600 lines per inch. If desired, for the sake of economy, the rasterization may be at a resolution less than that of the image resolution.

The system then proceeds to step 106 and selects bands of pixels along the image margins; and, at a minimum selects a band of single pixels; or, if a higher degree of commonality is desired a band of multiple pixels is selected at step 110. The system then proceeds to step 112 and makes an OR determination depending upon the selection of pixel bands and then proceeds to step 114 to compare the marginal pixel bands of the adjacent images for commonality, i.e., pattern, solid color or tint to be placed adjacent or in juxtaposition. The system then proceeds to step 116 and makes a determination whether the band comparison of step 114 is within a predetermined tolerance.

If the determination in step 116 is in the affirmative, the system proceeds to step 118 and places the images in abutment or adjoining without a gutter.

However, if the determination in step 116 is negative, the system proceeds to step 120 and asks whether the image has been rotated 180°. If the query of step 120 is affirmative, the system proceeds to place the pages to be juxtaposed, abutted or adjoined with a gutter at step 122.

In the event that the question asked in step 120 is answered in the negative, the system proceeds to step 124 and rotates one of the images 180° and then returns to step 114. If after repeat of steps 114 and 116, the selected pixel band comparison is within a predetermined tolerance, the rotated image is then adjoined to the adjacent image at step 118 and appears as illustrated in FIG. 4.

Although the present practice has been described herein above with respect to the exemplary illustrated embodiments, it will be understood that modifications and variations may be made within the scope of the following claims.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of automatically adjusting the placement of a plurality of images juxtaposed for imposition on a media sheet comprising:
    (a) user selecting the images to be juxtaposed and automatically rasterizing the images to be juxtaposed;
    (b) automatically selecting a band of pixels along the image margins to be juxtaposed;
    (c) automatically comparing the selected pixel bands to be juxtaposed for commonality of one of (i) repeating pattern, (ii) solid tint and (iii) solid color;
    (d) automatically determining if the pixel band comparison is within a predetermined tolerance value; and
    (e) automatically juxtaposing the images without a gutter only when the comparison is within the predetermined tolerance; and,
    (f) automatically imposing the juxtaposed images on a media sheet.

2. The method defined in claim 1, further comprising rotating one of the images 180° when the comparison is not within the predetermined value and repeating (c)-(e).

3. The method defined in claim 1, wherein the step of selecting a band of pixels includes selecting a band of single pixel width.

4. The method defined in claim 1, wherein the step of selecting a band of pixels includes selecting a band of multiple pixel width.

5. The method defined in claim 1, further comprising separating the sheet/page along the margins juxtaposed without a gutter.

6. The method defined in claim 1, wherein the step of rasterizing includes rasterizing at resolution less than that of the image imposition resolution.

7. The method defined in claim 1, wherein the step of rasterizing includes rasterizing at a number of lines from about 150 lines per inch to about 600 lines per inch.

8. The method defined in claim 1, further comprising imposing the images on the media sheet by the xerographic or dry particle fusion process.

9. The method defined in claim 1, further comprising imposing the images on the media sheet by an ink jet process.

10. An apparatus for automatically adjusting the placement of a plurality of images juxtaposed for imposition on a media sheet comprising:
    (a) a processor operable to automatically
        (i) rasterize the images to be juxtaposed;
        (ii) select a band of pixels along the image margins to be juxtaposed;
        (iii) compare the selected pixel bands to be juxtaposed for commonality of one of (i) repeating pattern, (ii) solid tint and (iii) solid color; and
        (iv) determine if the pixel band comparison is within a predetermined tolerance value; and,
    (b) imposing processor operable to juxtapose the images on a media sheet without a gutter only when the comparison is within the predetermined tolerance.

11. The apparatus defined in claim 10, wherein the processor is further operable to rotate one of the images 180° when the comparison is not within the predetermined value and to repeat steps a(iii) and a(iv).

12. The apparatus defined in claim 10, wherein the processor is operable to select a band of pixels having a single pixel band width.

13. The apparatus defined in claim 10, wherein the processor is operable to select a band of pixels of multiple pixel band width.

14. The apparatus defined in claim 10, wherein the processor is operable to rasterize the images at a resolution less than that of the image imposition resolution.

15. The apparatus defined in claim 10, wherein the processor is operable to rasterize the image at a number of lines from about 150 lines per inch to about 600 lines per inch.

16. The apparatus defined in claim 10, further comprising processor operable to impose the image by a xerographic or dry particle fusion process on the media sheet.

17. The apparatus defined in claim 10, further comprising processor operable to impose the image by an ink jet process on the media sheet.

* * * * *